(12) United States Patent
Parkhonyuk et al.

(10) Patent No.: US 11,091,994 B2
(45) Date of Patent: Aug. 17, 2021

(54) METHOD OF REFRACTURING IN A HORIZONTAL WELL

(71) Applicant: SCHLUMBERGER TECHNOLOGY CORPORATION, Sugar Land, TX (US)

(72) Inventors: Sergey Dmitrievich Parkhonyuk, Novosibirsk (RU); Evgeny Pavlovich Korelskiy, Tyumen (RU); Kreso Kurt Butula, Moscow (RU); Andrey Sergeevich Konchenko, Menlo Park, CA (US); Valeriy Anatolievich Pavlov, Tyumen (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 84 days.

(21) Appl. No.: 16/483,566

(22) PCT Filed: Feb. 8, 2017

(86) PCT No.: PCT/RU2017/000060
§ 371 (c)(1),
(2) Date: Aug. 5, 2019

(87) PCT Pub. No.: WO2018/147756
PCT Pub. Date: Aug. 16, 2018

(65) Prior Publication Data
US 2020/0024937 A1    Jan. 23, 2020

(51) Int. Cl.
*E21B 43/267*  (2006.01)
*E21B 33/134*  (2006.01)
(Continued)

(52) U.S. Cl.
CPC .......... *E21B 43/267* (2013.01); *E21B 33/134* (2013.01); *E21B 41/0092* (2013.01); *E21B 49/00* (2013.01); *E21B 47/06* (2013.01)

(58) Field of Classification Search
CPC .. E21B 43/267; E21B 33/134; E21B 41/0092; E21B 49/00; E21B 47/06
See application file for complete search history.

(56) References Cited

U.S. PATENT DOCUMENTS

| 7,565,929 B2 | 7/2009 | Bustos et al. |
| 8,210,257 B2 | 7/2012 | Dusterhoft et al. |
(Continued)

FOREIGN PATENT DOCUMENTS

| RU | 2462590 C1 | 9/2012 |
| RU | 2496001 C1 | 10/2013 |
(Continued)

OTHER PUBLICATIONS

International Preliminary Report on Patentability of International Patent Application No. PCT/RU2017/000060 dated Aug. 22, 2019; 8 page.
(Continued)

*Primary Examiner* — Taras P Bemko (57) ABSTRACT

A horizontal well may be refractured or reactivated by generating a geomechanical model to estimate the stress level in the formation; identifying zones with high, medium, and low stress levels in the formation; isolating existing fractures in the horizontal well; injecting a fracturing fluid into the well to create at least one new fracture in a zone with a low stress level and packing the created fracture with proppant to increase the stress level in the zone; isolating the at least one newly created fracture; initiating refracturing in the zone with the high and/or medium stress level; identifying a location of the refracturing crack in the zone with the high and/or medium stress level; and developing the refracturing crack and packing it with proppant.

15 Claims, 4 Drawing Sheets

(51) Int. Cl.
   *E21B 41/00* (2006.01)
   *E21B 49/00* (2006.01)
   *E21B 47/06* (2012.01)

(56) References Cited

U.S. PATENT DOCUMENTS

| | | |
|---|---|---|
| 9,366,124 B2 | 6/2016 | Brannon et al. |
| 2007/0079652 A1 | 4/2007 | Craig |
| 2017/0114613 A1* | 4/2017 | Lecerf ................ E21B 41/0092 |
| 2018/0355707 A1* | 12/2018 | Rodriguez Herrera .. G01V 1/42 |

FOREIGN PATENT DOCUMENTS

| | | |
|---|---|---|
| WO | 2018004370 A1 | 1/2018 |
| WO | 20218004369 A1 | 1/2018 |

OTHER PUBLICATIONS

Butula et al., "Re-fracturing Considerations of Horizontal Well Multi Stage Fractured Completions in Mid Permeability Formations", SPE-176720, Society of Petroleum Engineers, Oct. 26, 2015, 17 pages.

Jorgensen et al., "Using Flow Induced Stresses for Steering of Injection Fractures", SPE/ISRM 78220, Society of Petroleum Engineers, Oct. 20-23, 2002, 9 pages.

International Search Report and Written Opinion issued in International Patent Appl. No. PCT/RU2017/00060 dated Sep. 14, 2017; 7 pages.

English Translation of International Search Report issued in International Patent Appl. No. PCT/RU2017/000060 dated Sep. 14, 2017; 1 page.

* cited by examiner

METHOD OF REFRACTURING IN A HORIZONTAL WELL

The present disclosure is directed to oil and gas industry and can be useful for stimulating subterranean formation using a hydraulic fracturing operation (frac), in particular, for refracturing of the formation.

BACKGROUND

Hydraulic fracturing of the formation (frac), also referred to as hydraulic fracturing, is the main means to increase well production due to generation or expanding cracks or channels leading from the wellbore to the pay formation. Pumping beads of a propping agent (proppant) in the course of hydraulic fracturing of oil and gas bearing geological formations can increase the hydrocarbon production level of the formation.

The practice in oil and gas industry shows that a prolonged process of extraction of a formation fluid (oil and water), as well as pumping fluid into a formation can significantly change the stress pattern in the formation. The standard geomechanical and hydrodynamical models of the formation can be used for calculating the pattern of pore pressure distribution and stress tensor distribution in the formation. In practice, such calculations are performed at various stages of the formation lifetime, i.e. at the beginning of oil production, after well treatments, and at later s stages of production of the formation. For the later stages of production of the formation that has earlier undergone stimulation by hydraulic fracturing or multiple fracturing (multizone frac) in an open-hole horizontal well, the geomechanical models can be used to find lean and weakly depleted zones around the well. Zones, drainage of the formation fluid from which through the productive fractures was more intense, become the lean zones, and for them, the models predict a reduced level of minimal principal stress value (a component of the stress tensor), while virgin zones have the original high stress level in the productive formation.

For the formation with a horizontal (open-hole) well, a situation occurs that refracturing will be performed in a zone with a low in-situ stress in the rock surrounding the well. On the other hand, the regions with high in-situ stresses, according to the theory of hydraulic fracturing, will play the role of mechanical barriers that the fracture never enters. In other words, the drained (lean) formation regions become the mechanically "preferable" sites for the next hydraulic fracturing, while the lean zones are "non-preferable" sites for the purpose of additional formation stimulation and enhancement of the fluid(s) production. Therefore, the task of performing refracturing in a non-depleted zone having a potential for additional oil production requires "correcting" the stress field around the horizontal wellbore.

Hereinafter, the term "horizontal well" refers to a part of a drilled well with a horizontal or nearly level trajectory. Note that this task of refracturing on a horizontal part of a well differs from the task of performing refracturing in a vertical well. In the case of a vertical well, the hydrostatic pressure will be higher for deeper intervals, and an interval refracturing with sequential isolation of the lower intervals is feasible. In the case of a horizontal well, the hydrostatic pressure will be even for all parts of the well, and refracturing will occur at the site with the minimum stress level.

Technologies for influencing the mechanical stress pattern in a subterranean formation are available in literature. Publication SPE-78220-MS (Jorgensen, O. (2002 Jan. 1). "Using Flow Induced Stresses for Steering of Injection Fractures". Society of Petroleum Engineers.doi:10.2118/78220-MS) demonstrates that pumping aqueous fluid into the formation through an injection well affects the stress distribution in the formation, which can be used to control the hydraulic fracturing plane. Calculations demonstrated that after three months of production/injection, the direction of the effective horizontal stress in the rock changes, and the values of stresses in the rock surrounding the production well and surrounding the injection well differ by nearly 10 MPa.

Publication SPE-176720-RU (Butula, K. K., Yudin, A., & Klyubin, A. (2015 Oct. 26). "Re-fracturing Considerations of Horizontal Well Multi Stage Fractured Completions in Mid Permeability Formations" (Russian). Society of Petroleum Engineers.doi:10.2118/176720-RU) addresses the productivity of the horizontal wells completed with arrangements for multizonal hydraulic fracturing (multistage hydraulic fracturing, MSHF) drilled in the low and medium permeability formations. Refracturing modeling using a geomechanical model (e.g., the FRACCADE® software) demonstrated that such operation increases the fracture-formation interface area. Furthermore, it has also been shown that the azimuth of a refracturing crack changes relative to the existing "old" fractures. This is caused by the changes in the natural stress field under the influence of the combined changes in the formation pressure around the production and injection wells. The refracturing cracks are assumed to be normal to the existing hydraulic fracturing cracks. This ensures an increased oil recovery factor (ORF).

The methods of refracturing in a horizontal well are known from the practice of the oil-producing industry. U.S. Pat. No. 9,366,124 (BAKER HUGHES INCORPORATED, 2016) discloses a method of refracturing using packers and coil tubing conveyed into the horizontal part of the well. The horizontal (cased) well has several fracture clusters that need reactivation. Using a packer and a slug of a diverting agent, the furthest fracture cluster is first hydraulically isolated. Then, the isolated cluster is refractured at the existing ("old") fracture, which increases the hydrocarbon fluid production from the formation. The slug of the diverting agent (slurry of particles, which forms an isolating plug when delivered to the required site) is delivered via coil tubing to hydraulically isolate the cluster of the existing ("old") fractures. After completion of refracturing, the slug of the diverting agent is removed. Usually, the use of the packer for reliable isolation of a part of the wellbore is possible for the cased horizontal wells.

U.S. Pat. No. 8,210,257 (Halliburton Energy Services Inc, 2012) discloses a method of refracturing using the controlled injection units deployed in a horizontal well (e.g., controlled frac collar on a liner). By creating new fractures, the mechanical stress level in the formation is changed. Using control signals from the surface, the state of the injection units can be controlled (change of the "open-closed" state). After the pattern of stresses in the formation around the wellbore has been changed, the fracturing fluid is pumped into one isolated interval to initiate the creation of a fracturing network. The creation of the fracturing network on a larger part of the horizontal well instead of conventional (unbranched) fracture provides an additional volume of stimulated formation. On the other hand, the method requires a specialized subsystem to control the injectors, which complicates the arrangement for multizonal injection in the horizontal well.

Therefore, there is a demand for performing the refracturing operations for horizontal wells, wherein the auxiliary fractures are used to change the stress level in various formation zones (intervals), with subsequent refracturing in the less depleted zones. Furthermore, the refracturing operations are accompanied by the operations of isolating the existing ("old") fractures to ensure refracturing in the new (virgin) parts of the well. According to the provided method, refracturing can be performed without any additional wellbore equipment.

Also, when operating the injection horizontal wells, a situation may appear that the intake of the surrounding rock decreases over time. This may be caused by the changes in stresses at different formation parts, the processes of scale (salts) deposition from the injected aqueous liquid or slick water in the rock, which generally decreases the efficiency of the formation waterflooding. There is a demand for the methods of reactivation of an injection well by creating new fractures to stimulate the fluid injection in the formation for longer distances and in larger volumes.

SUMMARY

The present disclosure in its aspects provides the following.

One aspect of the present disclosure provides a method of refracturing in an open-hole horizontal well, wherein the productive fractures are present. The method starts from generating a geomechanical model to estimate the stress level in the formation. Based on the generated geomechanical model of the formation, zones with high, medium, and low stress levels in the rock surrounding the wellbore are identified. Then, the existing ("old") fractures in the horizontal well are isolated by injecting slugs of an isolating agent.

After that, in the selected interval with originally low stress level in the formation (i.e. in a lean zone), the stress level is increased by creating at least one auxiliary fracture and packing the created fracture with proppant: a small-sized auxiliary fracture is thus formed ("stress fracture", i.e. a fracture to locally increase the stress level). After closing this auxiliary fracture, the stress level in the selected zone increases from the original low value up to a medium or high value. The new stress distribution near the horizontal well allows performing refracturing at a new site, where the originally high stress level now turns out to be lower than in the zone of the auxiliary fracture, and thus favourable conditions for the development of a new fracture have been created.

At least one propped fracture in the part with an originally low stress level in the formation is isolated (using an isolating agent). The isolating agent (or the isolating pill) is a plug of the slurry of plugging particles and fibres that, upon injecting in an open crack, build up therein and reduce the fluid intake.

Refracturing is then initiated in the zone with an originally high or medium stress level (which have previously been identified on the basis of the geomechanical model). While the refracturing crack is in an open state, the location identification of the refracturing crack relative to the zones of high, medium, and low stress levels in the formation around the well is performed. If, based on the identification results, the open crack is located in the zones of originally high or medium stress level, the injection of the fracturing fluid is continued to develop further and pack the refracturing crack with proppant. If required, several refracturing cracks are created.

According to another aspect of the present disclosure, a method is provided to reactivate an injection horizontal multizonal well, wherein the new refracturing cracks created in the zones with originally high or medium stress level are used to inject an aqueous liquid or slick water into the formation.

DETAILED DESCRIPTION

The present disclosure is based on the task of creating a refracturing method for a horizontally arranged well.

The first stage of the disclosed method comprises modeling the formation to determine the intervals of the horizontal well having various stress levels.

The geomechanical model (stress distribution and pore pressure distribution) is generated using various commercially available software with varying degrees of model details. Thus, a 3D distribution of formation stress at different stages of well(s) lifetime can be obtained using, e.g., the PETREL® software (Schlumberger product). Software packages Ru-FRAC or MANGROVE® and Visage (Schlumberger products) also have options for calculating new stress distribution after refracturing. A 3D geomechanical model taking into account the temporal evolution of the formation can reveal the zones with different stress levels in the formation with the existing ("old") fractures.

To generate a simplified geomechanical model, the simplified (2D and 1D) frac simulators are used, wherein, in addition to the standard input data on the formation (mechanical strength, porosity, permeability, formation breakdown pressure), additional semi-empirical data on the mechanical stress distribution around the wellbore are entered. As used herein, the term "geomechanical model" refers to the results of numerical modeling of the formation of any level of complexity, which can be used to reliably identify zones (intervals) with different stress levels near the horizontal well.

The classification of a horizontal part of the well into the zones with high, medium, or low stress levels in the rock is performed relative to a certain "average" stress level around the horizontal well. The suitable main parameters for consideration of the stressed state of the rock are either stress modulus (when modeling the isotropic stress), or components of the stress tensor (in the case of the anisotropic stress). In one embodiment, the geomechanical model provides the major horizontal stress, which is the main parameter for predicting hydraulic fracturing on a horizontal part of the well.

The difference between the stress levels in different intervals (zones) identified on the basis of the geomechanical model amounts to more than 1 bar. In this case, the fracture development in the formation will depend on the interval classification. A lower difference in stress between intervals cannot change the prediction of the refracturing site.

Figure 1:
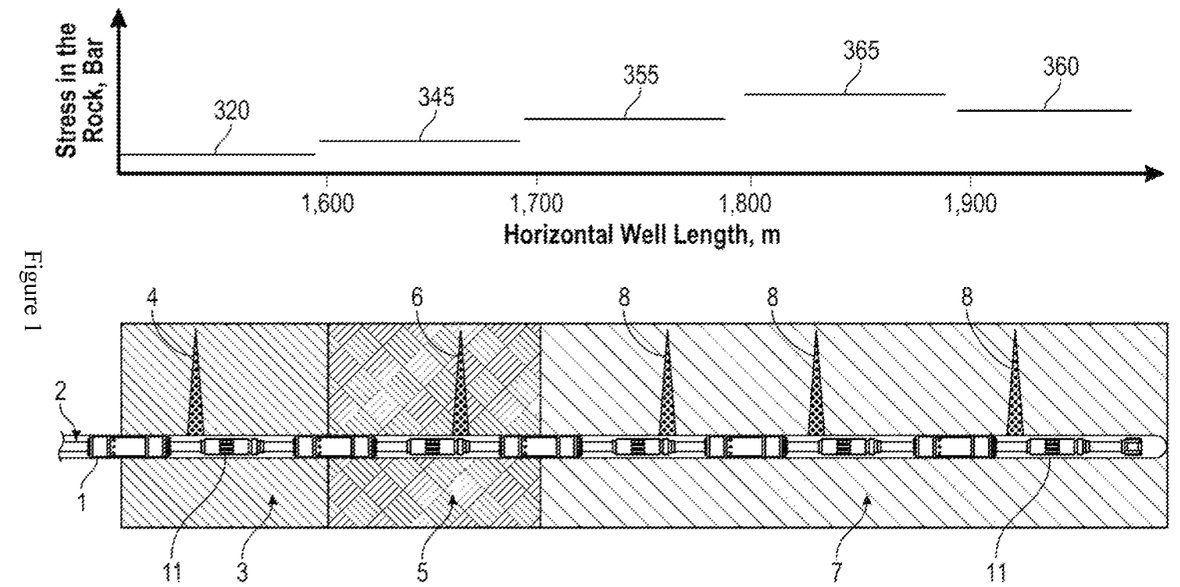
FIG. 1 shows a schematic drawing of a horizontal well with the arrangement for multi-interval treatment and non-isolated existing ("old") fractures (the starting configuration for refracturing).

FIG. 1 shows a schematic drawing of a horizontal well with the arrangement for multi-interval treatment and productive fractures (regular fractures). The fractures belong to the intervals with different mechanical properties (stress levels) and different rock drainage levels (lean and rich). The method of refracturing in the horizontal well 1 is performed using a standard arrangement 2 for multizonal treatment (multistage hydraulic fracturing, MSHF) of the horizontal well. The multizonal arrangement 2 for the horizontal part of the well includes a liner pipe, onto which the interval packers are deployed, frac collars (also referred to as the frac ports), through which the fracturing fluid (either a proppant slurry or a proppant-free fluid) is injected into the desired zone of the well. The multizonal arrangement type FALCON or StageFRAC (Schlumberger product) can also be employed.

In another embodiment, the operation of injecting the fracturing fluid and injection of the isolating agent are performed in an open-hole horizontal well. As will be readily apparent to those of ordinary skill in the art, other arrangements are also possible for this part.

At the first stage, a computer modeling of the stress levels using an available geomechanical model (in 2D or 3D approximation) is performed for the formation traversed with the horizontal well 1 with productive fractures. Such geomechanical model (e.g., VISAGE and PETREL®) provides a complete 3D pattern of the stress tensor and pore pressure in the rock of the reservoir. Using the geomechanical model, the zones of different types are identified along the well: zones with a low 3, moderate (medium) 5, and high 7 stress levels in the formation. These zones 3, 5, 7 already have productive fractures. Thus, a zone with a low stress level 3 has a fracture 4, a zone with a medium stress level 5 has a fracture 6, while a zone with a high stress level 7 has several fractures 8. These zones differ not only in the stress level, but also in the degree of depletion and other characteristics.

Such zoning (zones 3-5-7) of the horizontal part of the well at later stages of production is usually related to the history of the formation fluid production from the reservoir, i.e. to the presence of the drained (lean) zones of the formation, which is shown as a decreased pore pressure (in the case of a linear-elastic geomechanical model, the pore pressure in the rock is directly associated with the stress). Usually, the depleted interval 3 has the lowest stress level. The virgin (having high pore pressure) zones (5 and 7 in FIG. 1) retain the originally high stress level.

As an exemplary embodiment, FIG. 1 shows three intervals (3, 5, 7), for which a diagram of the zone-average stress in the formation is given in the upper part of the drawing. For example, zone 3 has the stress level of about 320 bar as compared to 355-365 bar for a weakly drained zone (zone 7). The stress level in the selected zones has been found using the PETREL® geomechanical model and corresponds to the regions with a high, medium (moderate), and low formation drainage.

Figure 2:
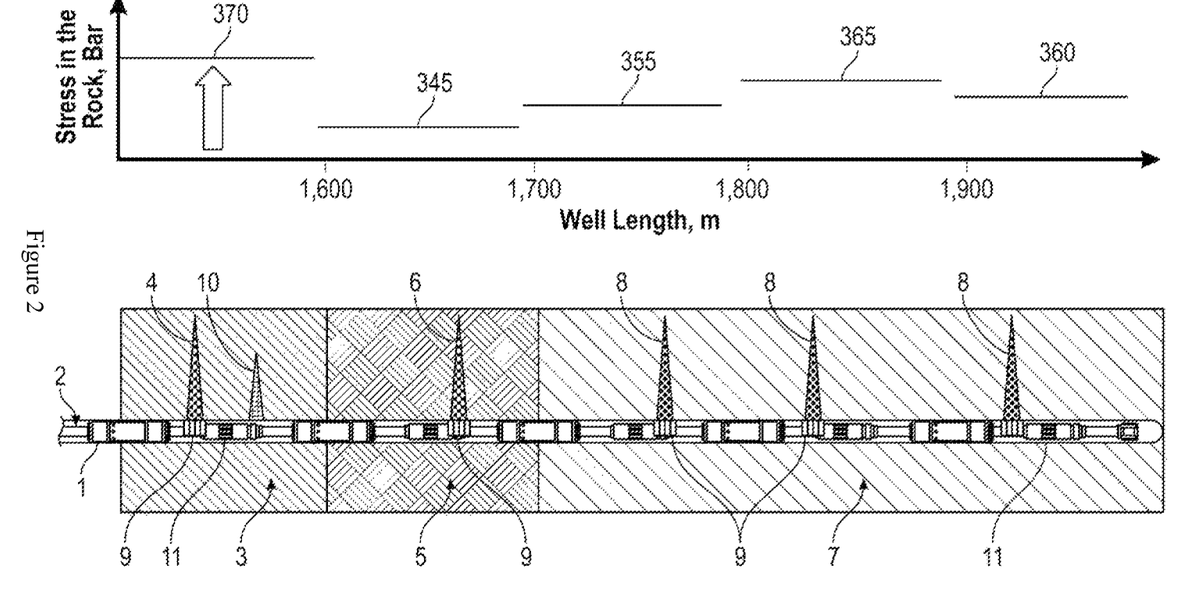
FIG. 2 shows a schematic drawing of a horizontal well with the arrangement for multi-interval treatment with isolated existing ("old") fractures and one small-sized auxiliary fracture.

At the next stage, the isolation (plugging, formation damage) of the existing fractures 4, 6, 8 is performed. FIG. 2 shows a schematic drawing of a horizontal well with the arrangement for multi-interval treatment with the isolated fractures 4, 6, 8. FIG. 2 shows that the isolating pills 9 (slugs of the isolating agent) close the entrance of the fractures (4, 6, 8). The isolating pills 9 can be prepared of a downhole non-degradable or degradable material (in the latter option, a temporary fracture isolation for the duration of operation is achieved). The technique for delivery and deployment of the isolating material (slugs in the form of particles and fibre slurry) in the open fractures is disclosed in U.S. Pat. No. 7,565,929 (Schlumberger Technology Company).

After minimizing the ingress of the fracturing fluid into the isolated fractures, the stage of creating an auxiliary fracture 10 (or several auxiliary fractures) in the part of the horizontal well (for a local increase in the stress level in this zone 3) is performed. Since, according to the mechanics laws, a fracture arises and develops in the regions with a low major stress value, the auxiliary fracture 10 arises directly in zone 3 with the decreased stress level. The development of the auxiliary fracture 10 (or several auxiliary fractures) in the zone with the low stress level in the formation locally increases the stress level (up to the level of 370 bar in FIG. 2). The stress level is stably increased if the auxiliary fracture 10 is packed with a high-strength proppant. The propping agent (proppant) props the fracture walls, thereby preserving the increased stress in zone 3 (the stress increased up to the level of 370 bar in FIG. 2), which is significantly higher than in the original situation. Suitable proppants for the auxiliary fracture 10 include high-strength quartz sands or artificial ceramic sands, or mixtures thereof. According to the disclosure, the operation of creating the auxiliary fracture 10 in the zone with an originally low stress level increases the stress level by at least 5 bar. Such increase in the stress exceeds the difference in the stresses found for the zones (3, 5, 7) in the geomechanical model. According to the modern techniques, a direct measurement of stress in the rock surrounding the well is complicated; therefore, the data of the numerical modeling is used.

There are two sources of the increased stress in zone 3: the propped small-sized auxiliary fracture 10 (the purely mechanical load propagates through the formation around the fracture), and infiltration of the fracturing fluid itself into the formation (local injection of the pore fluid).

The modeling of the process of creating a planar fracture demonstrates that the increase in the stress level and the pore pressure over time becomes noticeable at the distances of the order of the fracture length. A kind of stress "diffusion" over the formation takes place, i.e. the required increase in the stress occurs at the scale of the entire zone where the propped fracture 10 ("the stress fracture") appeared. Furthermore, the amount of the fracturing fluid (with proppant) required to create the fracture 10 is 5% to 50% of the amount of the fracturing fluid required for refracturing (see subsequent stages). At the same time, the fracture 10 is auxiliary and small in size, since such fracture 10 is originally created not for production of the formation fluid (the fracture has a volume less than a "regular" fracturing crack), but rather to change the stress level in the formation in the treatment zone.

At the next stage (FIG. 3), the propped fracture 10 is isolated with a slug of the isolating agent 9. Now, the formation surrounding the horizontal well 1 has been prepared for refracturing: all productive fractures (4, 6, 8) and the (new) auxiliary fracture 10 have been isolated; therefore, the fracturing fluid at a pressure exceeding the formation breakdown pressure will be injected in the initiated fracture. After isolating the propped fracture 10, refracturing is performed in the zones with the originally medium and high stress levels (such zones 5 and 7 have previously been identified on the basis of the geomechanical model). Refracturing proceeds in zones 5 and 7 with a low drainage level (virgin zones of the formation).

Figure 3:
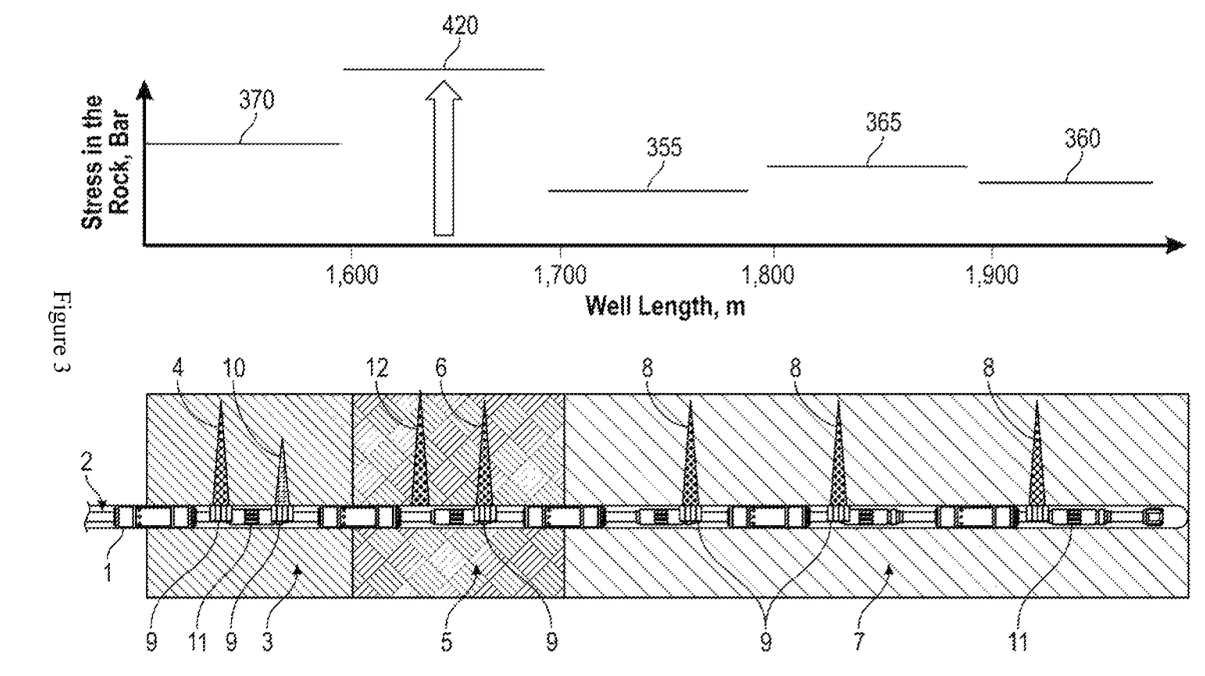
FIG. 3 shows a schematic drawing of a horizontal well with the arrangement for multi-interval treatment with isolated existing ("old") fractures and one refracturing (new) crack.

At the next stage of the method, a refracturing crack 12 is initiated by increasing the fluid pressure in the horizontal well 1 beyond the level of the formation breakdown pressure (FIG. 3). The initiation is achieved by injecting the pad (proppant-free) fluid at a high pressure. At this stage, the operator needs to know that the fracture 12 has been opened in the required zone (zone 5 or 7, but not zone 3). To do this, the injection of fluid at a pressure exceeding the formation breakdown pressure is continued, and the location identification of the refracturing crack is performed. The methods of identification of an open fracture rely on the fact that an open fracture is a hydrodynamic singularity in the well filled with fluid in contrast to the closed fractures 4, 6, 8, 10 (FIG. 2).

In an embodiment of the disclosure, the location identification of the refracturing crack is performed by pumping a "marker" fluid pulse in the wellbore and registering the resulting pressure response in the fluid filling the wellbore. The method of determining the actual location of an open fracture using a marker pulse has been disclosed in patent application PCT/RU2016/000408 and is hereby incorporated by reference in its entirety.

In other embodiments of the disclosure, the location identification of the refracturing crack is performed by registering tube waves in the well. Such method of the location identification of the wellbore objects (such as an open fracture) uses a special technique for processing signals with a high noise level in the well. The method has been described in patent application PCT/RU2016/000407 and is hereby incorporated by reference in its entirety.

After the positive location identification of the initiated refracturing crack (the fracture develops in a zone with a medium or high stress), the injection of the proppant slurry for propping the refracturing crack 12 is continued.

FIG. 3 shows a schematic drawing of a part of a horizontal well with the arrangement for multizonal treatment after isolating (plugging) the fractures 4, 6, 8 and isolating the auxiliary fracture 10. A refracturing crack (re-frac) 12 has been created and propped in the zone with an originally medium stress level (zone 5). The creating of the refracturing crack 12 also (locally) increases the stress level in zone 5 (from the level of 345 bar to the level of 420 bar, cf. FIG. 2 and FIG. 3). The amount of the injected fracturing fluid for developing and propping the refracturing crack 12 is determined on the basis of an earlier prepared frac design using the commercially available frac simulators. A temporary plugging of the refracturing crack 12 with a self-degradable plugging agent is also possible to continue stimulation of other formation zones, as described above.

According to the method, the subsequent refracturing cracks (not shown in FIG. 3) may be created in the intervals 5 and 7. The process is repeated as described above with the purpose of locally increasing the stress level in the fracturing zone to perform subsequent refracturing in one of the zones. Subsequent refracturing in zones 5 and 7 provides a multizonal treatment of the formation, thus allowing an increase in the volume of the stimulated formation and an improvement in the oil recovery factor (ORF). This approach equips an engineer with a toolbox of auxiliary hydraulic fracturing, fracture isolation and refracturing techniques for treating all the zones on the horizontal part of the well.

The exact location of the new fracture (such as the refracturing crack 12 in zone 5) depends on numerous geomechanical factors, since the stresses within each of the selected zones are not constant and may vary due to the "stress diffusion" in the rock.

When necessary, at the stages after propping and isolating the auxiliary fracture 10 and after propping and closing the refracturing crack 12, additional modeling of the stress level is performed to predict the location of the next refracturing crack.

EXAMPLES

Below the results of refracturing of a formation are provided, wherein an intense production of the formation fluid (oil or oil-water-gas mixture) has been performed for 2-3 years through the horizontal well with multizonal hydraulic fracturing (several fractures), which resulted in the appearance of the lean and weakly-depleted zones around the horizontal well.

Figure 4:
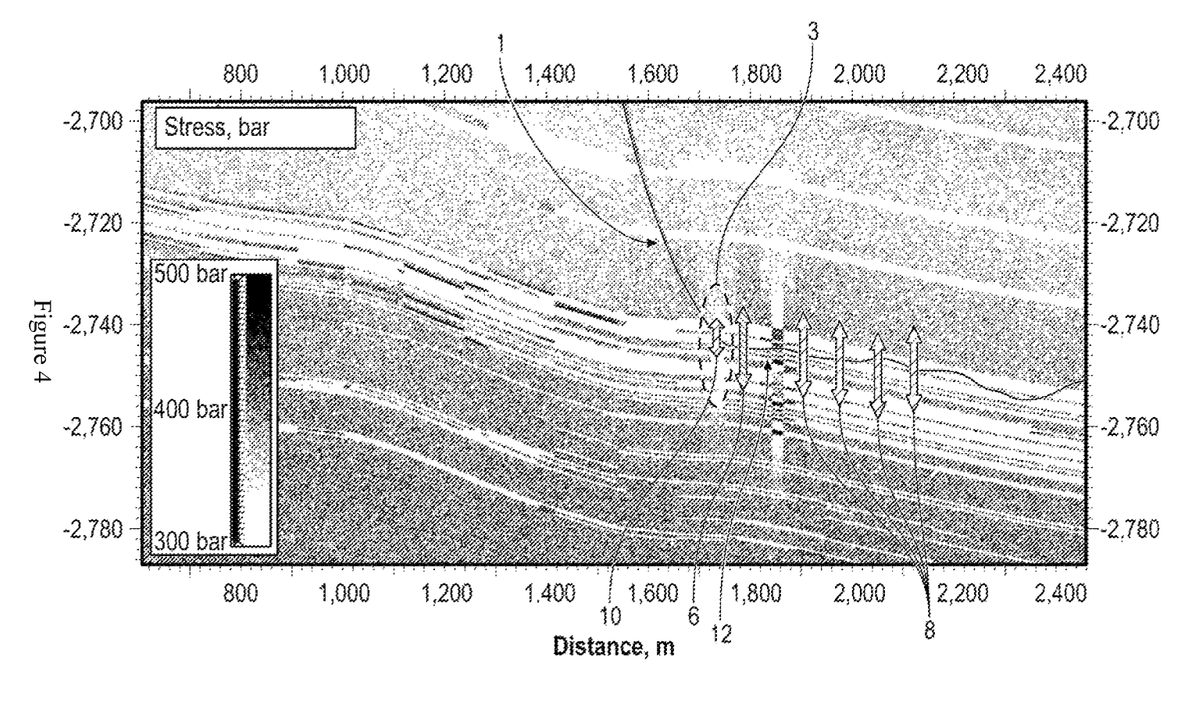
FIG. 4 shows a vertical cross-section of a drilled well in a productive formation: the results of a geomechanical modeling with the zones having various stress levels and refracturing cracks are indicated.

FIG. 4 shows the results of refracturing over the zones of the horizontal well and data of the geomechanical model on the stress level in the formation after refracturing.

Geomechanical Model of Formation

The processes occurring in the course of auxiliary hydraulic fracturing to locally change the stress level were modeled using the VISAGE® software (Schlumberger Technology Company, geomechanical simulator) and the ECLIPSE® software (Schlumberger Technology Company, hydrodynamical simulator), with modeling script prepared in the PETREL® environment. As the input data, superimposed hydrodynamical and geomechanical models were used, as well as data on the pumping schedule, fluid volume, and type of the injected fracturing fluid. When generating the model of the formation and fractures, the hydrodynamical and geomechanical models are superimposed. The ECLIPSE® software takes into account the geometry of the auxiliary fracture 10 (height, length) that are found using the frac simulators (FracCADE or RU-FRAC). The effect of creating and propping the fractures on the stress distribution over the zones is evaluated using the VISAGE software. To obtain the desired effect, the minimum horizontal stresses in the stimulation zone must exceed the formation breakdown pressure for the next zone where the stimulation is scheduled.

Well and Formation

The considered well 1 had the length of a horizontal bore of about 800 m. The absolute depth of the formation was within the range of 2,730-2,800 m. A ball arrangement 2 for a six-stage hydraulic fracturing (multistage hydraulic fracturing, MSHF) with the distance between the frac ports of 100-120 m was hauled down into the well. At the moment of refracturing, the balls and ball seats of the MSHF arrangement had been drilled, i.e. there were no barriers for the fracturing fluid transport.

The cubes of filtration and capacity parameters for the hydrodynamic modeling were generated using the current geological model, well data, and core examination; geostatistical methods were used for modeling in the inter-well space. The considered well had porosity in the permeable intervals 11-18% and permeability 0.7-11 milliDarcy. The thickness of the permeable intervals was 12-14 m. The hydrodynamic model builds upon the history of the formation fluid production (or fluid injection into the formation).

The geomechanical model of the formation was generated using the data of geophysical well logging and core examination. The mechanical properties of the surrounding rock were modeled using the geostatistical methods, the stress-strained state was modeled with the VISAGE® software that uses the finite elements method. Furthermore, the geomechanical model was checked using the data of mini-frac (mini-frac is a diagnostic method to perform limited-volume hydraulic fracturing for checking the actual breakdown pressure and estimating intake of the formation). Young modulus around the horizontal well was 14-27 GPa for sandrock and 8-12 GPa for clays, Poisson ratios for sandrock and clays were 0.21-0.25 and 0.28-0.31, respectively.

At the moment of performing the work, the formation pressure was 160-190 bar, or 0.6-0.7 of the original pressure in the reservoir. The minimum horizontal stress based on the results of modeling was found to be 350-370 bar. As the modeling demonstrates, in one of the well intervals there is a low-stress and low pore pressure zone: this zone is the target for creating and propping the auxiliary fracture 10.

Modeling of the stress level in the formation demonstrated that creation of a small-sized auxiliary fracture 10 in the interval with low stress level 3 locally increases the stress for the period of up to 48 hours, during which refracturing in other target zones was performed.

Into the auxiliary fracture 10 created in the zone with low stress level, the operator injected 85 $m^3$ of fluid; proppant amount was 2 tons. For the main work (for refracturing), 50 tons of proppant and 160-200 $m^3$ of fluid were pumped at each stage. Half-length of the auxiliary fracture 10 (based on the results of modeling in the frac simulator) was 15-20 m, with the modeled half-length of the refracturing crack being close to 120 m. Thus, the dimensions and volume of the auxiliary fracture 10 are much lower than those for refracturing (main frac).

Temporary Fracture Isolation with Isolating Agent

A step-wise isolation of all existing ("old") fractures and the auxiliary fracture 10 was performed using the technologies of fracture isolation and fluid diversion to other zones for multizonal hydraulic fracturing, According to this technology, a mixture of plugging particles with a multimodal size distribution and degradable fibres was injected into the fractures for plugging. The mixture was delivered as a slug of slurry in a slick water. As a result of ingress of this slug into the fracture, a low permeability isolating plug was formed with rather low material consumption to form the isolating plug. Today, self-degradable materials for isolation can be selected (such as, e.g., particles of fibres made of polylactic or polyglycol acid) that would provide a gradual plug degradation for the formation temperature within the range of 40° C. to 200° C. The fractures can also be isolated with a non-degradable plugging agent (such as, for example, particles of calcium carbonate and polymer fibres).

FIG. 4 shows the performance of two refracturings 12 in the zones with the earlier isolated productive fractures 8. An increase in the stress level in zone 3 after creating the auxiliary fracture 10 is reflected with a darker tone on the 2D pattern of the stress distribution (see the corresponding legend in the left part of the pattern). Modeling of the formation fluid (oil) influx in the horizontal well through the refracturing cracks 12 demonstrates a gain in oil production.

Although only several exemplary embodiments of the present disclosure have been described in detail above, those of ordinary skill in the art will readily appreciate that numerous modifications of the provided embodiments are possible without materially departing from this disclosure. Accordingly, all such modifications should be included in the scope of the disclosure as defined in the claims below.

The invention claimed is:

1. A method of refracturing in a horizontal well, which comprises: (a) generating a geomechanical model to estimate the stress level in a formation; (b) identifying zones along the horizontal well with high, medium, and low stress levels in the formation around the well based on the generated geomechanical model of the formation, wherein the stress levels between different intervals differ by more than 1 bar; (c) isolating existing fractures in the horizontal well; (d) injecting a fracturing fluid into the well to create at least one new fracture in a zone with a low stress level and packing the newly created fracture with proppant to increase the stress level in the zone; (e) isolating at least one fracture created at stage (d); (f) initiating refracturing in the zone with a high and/or medium stress level identified at stage (b); (g) identifying a location of the refracturing crack in the zone with a high and/or medium stress level; (i) developing the refracturing crack and packing it with proppant.

2. The method of claim 1, wherein the isolation of the fractures at stages (c) and (e) is achieved by injecting slugs of a plugging agent.

3. The method of claim 1, wherein the development of the refracturing crack and its packing with proppant at stage (i) are performed in the zone with a high and/or medium stress level in the formation around the well identified at stage (b).

4. The method of claim 1, wherein the geomechanical model is generated on the basis of the temporal evolution of the 3D distribution of formation stress and pore pressure.

5. The method of claim 1, wherein the geomechanical model is generated on the basis of the temporal evolution of the 2D distribution of formation stress and pore pressure.

6. The method of claim 1, wherein the amount of the fracturing fluid with proppant for creating the fracture at stage (d) is within the range of 5% to 50% of the fracturing fluid amount with proppant for refracturing.

7. The method of claim 1, wherein the hydraulic fracturing operation at stage (d) in the zone with the low stress level increases the stress level by at least 5 bar.

8. The method of claim 1, wherein, after hydraulic fracturing at stage (d), the new stress level in the formation around the well is additionally determined using the geomechanical model.

9. The method of claim 1, wherein the location identification of the refracturing crack at stage (g) is performed by pumping a viscous marker pulse in the well and registering the resulting pressure response in the fluid.

10. The method of claim 1, wherein the location identification of the refracturing crack at stage (g) is performed by registering tube waves in the well.

11. The method of claim 1, wherein the hydraulic fracturing operation at stage (d) is performed by pumping a slurry of a high-strength ceramic sand and/or quartz sand.

12. The method of claim 1, wherein stage (i) is repeated in the zone with the high and/or medium stress level in the formation around the well identified at stage (b).

13. The method of claim 1, wherein the operation of injecting the fracturing fluid is performed using a multizonal arrangement comprising, e.g., a liner, packers, frac collars.

14. The method of claim 1, wherein the operation of injecting the fracturing fluid is performed in an open-hole horizontal well.

15. A method of reactivating an injection horizontal well, which comprises: (a) generating a geomechanical model to estimate the stress level in a formation; (b) identifying zones with high, medium, and low stress levels in the formation around the well based on the generated geomechanical model of the formation, wherein the stress levels between different intervals differ by more than 1 bar; (c) isolating existing fractures in the horizontal well; (d) injecting a fracturing fluid into the well to create at least one new fracture in a zone with a low stress level and packing the newly created fracture with proppant to increase the stress level in the zone; (e) isolating at least one fracture created at stage (d); (f) initiating refracturing in the zone with the high and/or medium stress level identified at stage (b); (g) identifying a location of the refracturing crack in the zone with a high and/or medium stress level; (i) developing the refracturing crack and packing it with proppant; (k) pumping the injecting fluid into the formation to increase the formation pressure or improve the oil recovery factor.

* * * * *